United States Patent [19]
Wicks

[11] Patent Number: 6,011,485
[45] Date of Patent: Jan. 4, 2000

[54] PAGING SYSTEM FOR PLACING WAGERS

[75] Inventor: James E. Wicks, San Francisco, Calif.

[73] Assignees: Sony Corporation, Tokyo, Japan; Sony Electronics, Inc., Park Ridge, N.J.

[21] Appl. No.: 08/808,869

[22] Filed: Feb. 28, 1997

[51] Int. Cl.[7] .................................................... G08B 5/22
[52] U.S. Cl. ........................................ 340/825.44; 463/40
[58] Field of Search ............................... 340/825.44, 905, 340/825.56; 455/38.1, 38.4, 53.1, 54.2, 56.1, 186.1, 345; 348/1, 4, 12, 13, 14, 20; 273/292, 303, 304, 305; 463/40

[56] References Cited

U.S. PATENT DOCUMENTS

| | | |
|---|---|---|
| 4,415,065 | 11/1983 | Sandstedt . |
| 4,644,351 | 2/1987 | Zabarsky et al. .................. 340/825.44 |
| 4,951,039 | 8/1990 | Schwendeman et al. . |
| 5,173,688 | 12/1992 | DeLuca et al. . |
| 5,182,553 | 1/1993 | Kung ................................... 340/825.44 |
| 5,212,636 | 5/1993 | Nakazawa ........................... 340/825.44 |
| 5,331,431 | 7/1994 | Jasinski . |
| 5,446,678 | 8/1995 | Saltzstein et al. . |
| 5,452,356 | 9/1995 | Albert . |
| 5,481,255 | 1/1996 | Albert et al. . |
| 5,491,785 | 2/1996 | Robson et al. . |
| 5,495,344 | 2/1996 | Callaway, Jr. et al. . |
| 5,508,695 | 4/1996 | Nelson et al. . |
| 5,508,731 | 4/1996 | Kohorn ....................................... 348/1 |
| 5,535,428 | 7/1996 | King et al. . |
| 5,555,446 | 9/1996 | Jasinski ............................... 340/825.44 |
| 5,759,101 | 6/1998 | Von Kohorn ............................. 463/40 |
| 5,772,211 | 6/1998 | Nazaryan et al. ...................... 273/292 |

*Primary Examiner*—Michael Horabik
*Assistant Examiner*—Jean B. Jeanglaude
*Attorney, Agent, or Firm*—Ronald P. Kananen; Rader, Fishman & Grauer

[57] ABSTRACT

A novel paging technology allows a gambler to receive information about an event on which a wager may be placed. The pager may also including an input device for inputting wager information and a transmitter for transmitting the wager information so as to place a wager in response to the input. The pager may be used over an extended area or localized to the track or other event forum where the betting occurs.

6 Claims, 5 Drawing Sheets

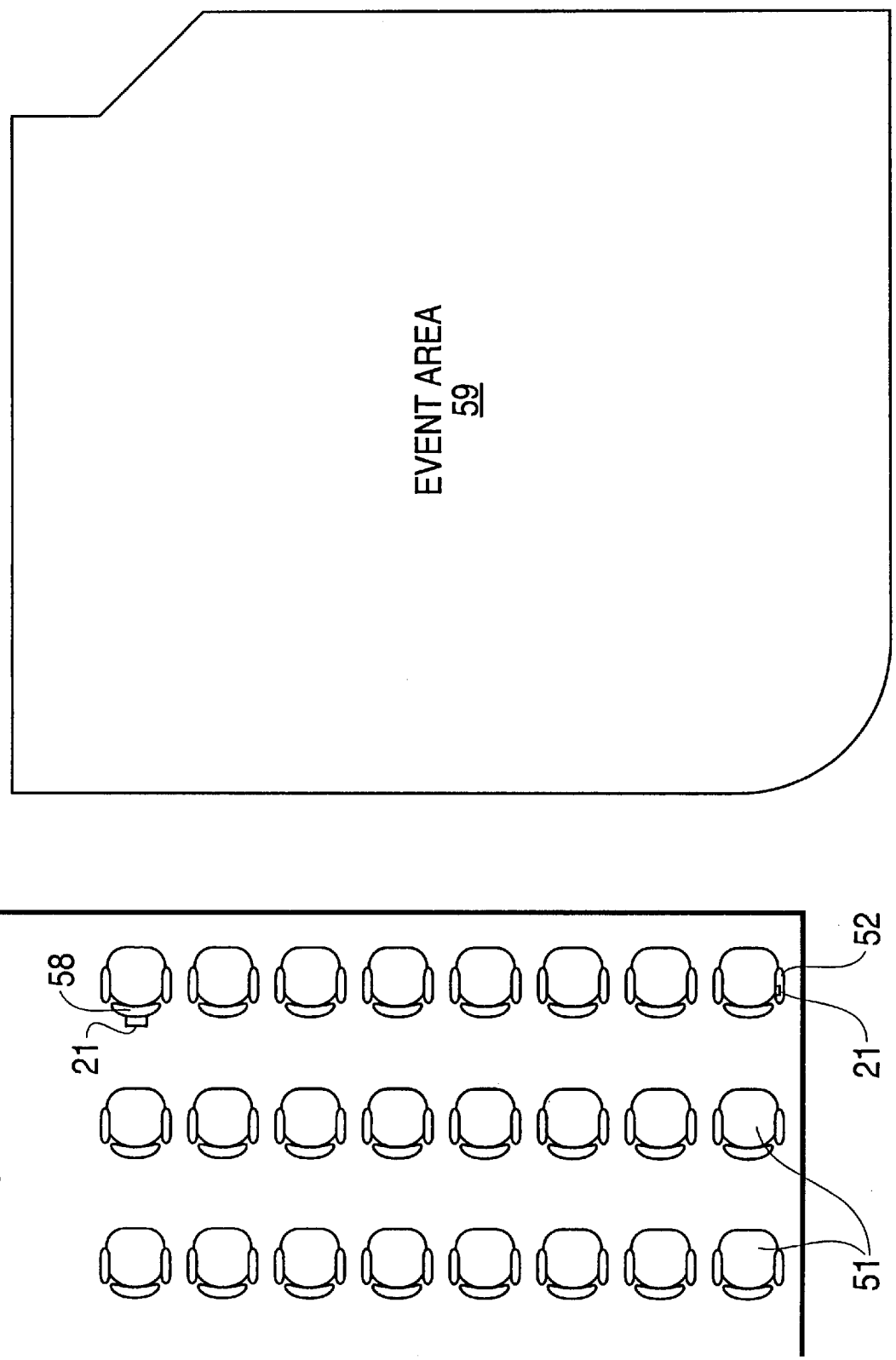

PAGING SYSTEM FOR PLACING WAGERS

FIELD OF THE INVENTION

The present invention relates generally to the field of wireless pagers. More particularly, the present invention relates to an application of wireless pager technology as a means for receiving event information and for placing wagers regarding the outcome of the event.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but also to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information, recreation and communication demands of pager users.

Unlike modern pager technology, the pastime of placing wagers on the outcome of sporting and other events is very old. In some areas, any form of gambling is tightly regulated by law. However, in other areas around the world, gambling is an accepted recreational activity.

Accordingly, there is need for a means of disseminating information about an event on which wagers may be placed. There is a further need for an improved means of placing wagers. Finally, there is a need for an improved means of disseminating such information and placing wagers both at the event and away from the event, e.g. on- and off-track.

SUMMARY OF THE INVENTION

It is an object of the present invention to meet the above identified needs and others. More particularly, it is an object of the present invention to provide a novel paging system and a method of using the same to provide a means for disseminating information about events on which wagers may be placed and for allowing wagers to be placed.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a paging system for wagering having: a database of event information containing information about events on which wagers may be placed; a central processor for accessing the event information in the database; at least on transmitter for transmitting the event information to a pager unit; and at least one receiver for receiving a transmission containing wager information from a pager.

The event information may include a listing of participants in the event and information about at least one anticipated outcome of the event. The wager information may include a selected participant and a wager amount.

The paging system of the present invention may further include a plurality of stations for wagering with a pager unit associated with each the station. The stations may be seats from which the event may be observed, directly or electronically.

The present invention also encompasses a pager for placing wagers having: a display; a controller; an antenna for receiving transmissions containing event information, where the event information concerns an event on which a wager may be placed; and input means for inputting data to the pager, the data comprising wager information. The wager information is transmitted by the controller and the antenna to a paging system.

The pager of the present invention may further include a memory unit for storing the event information, and an event information request icon displayed on the display. When the icon is selected with the input means, a request for event information is transmitted to the paging system.

The pager of the present information may further include a display of a plurality of wager amounts from which a desired wager amount may be selected, or a virtual numeric keyboard for entering the amount of a wager.

The present invention also encompasses a method of using a paging system for wagering by compiling a database of event information about events on which wagers may be placed; accessing the event information in the database with a central processor; transmitting the event information to a pager unit; receiving a transmission containing wager information from a pager.

The present method may also include providing a plurality of stations for wagering; and associating one the pager units with each the station. Again, the stations may be seats from which the event may be observed, directly or electronically.

The present invention may also encompass a method of using a pager for placing wagers by receiving transmissions containing event information, where the event information concerns an event on which a wager may be placed; displaying the event information with a display; inputting data to the pager, the data comprising wager information; transmitting the wager information; and storing the event information in a memory unit.

The present method may continue by displaying an event information request icon on the display; selecting the icon with data input means; and transmitting a request for event information in response to the selection of the icon.

The present method may also include displaying a plurality of wager amounts on the display; and selecting a desired wager from among the displayed amounts. Alternatively, the method may include providing a virtual numeric keyboard for entering the amount of a wager.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 5 is a diagram of an event arena according to the principles of the present invention.

DETAILED DESCRIPTION OF THE PREFERRED EMBODIMENT

Using the drawings, the preferred embodiment of the present invention will now be explained. Under the principles of the present invention, pager technology can be adapted to provide a means for disseminating information about an event on which wagers may be placed and may further provide a means for placing wagers.

Figure 1:
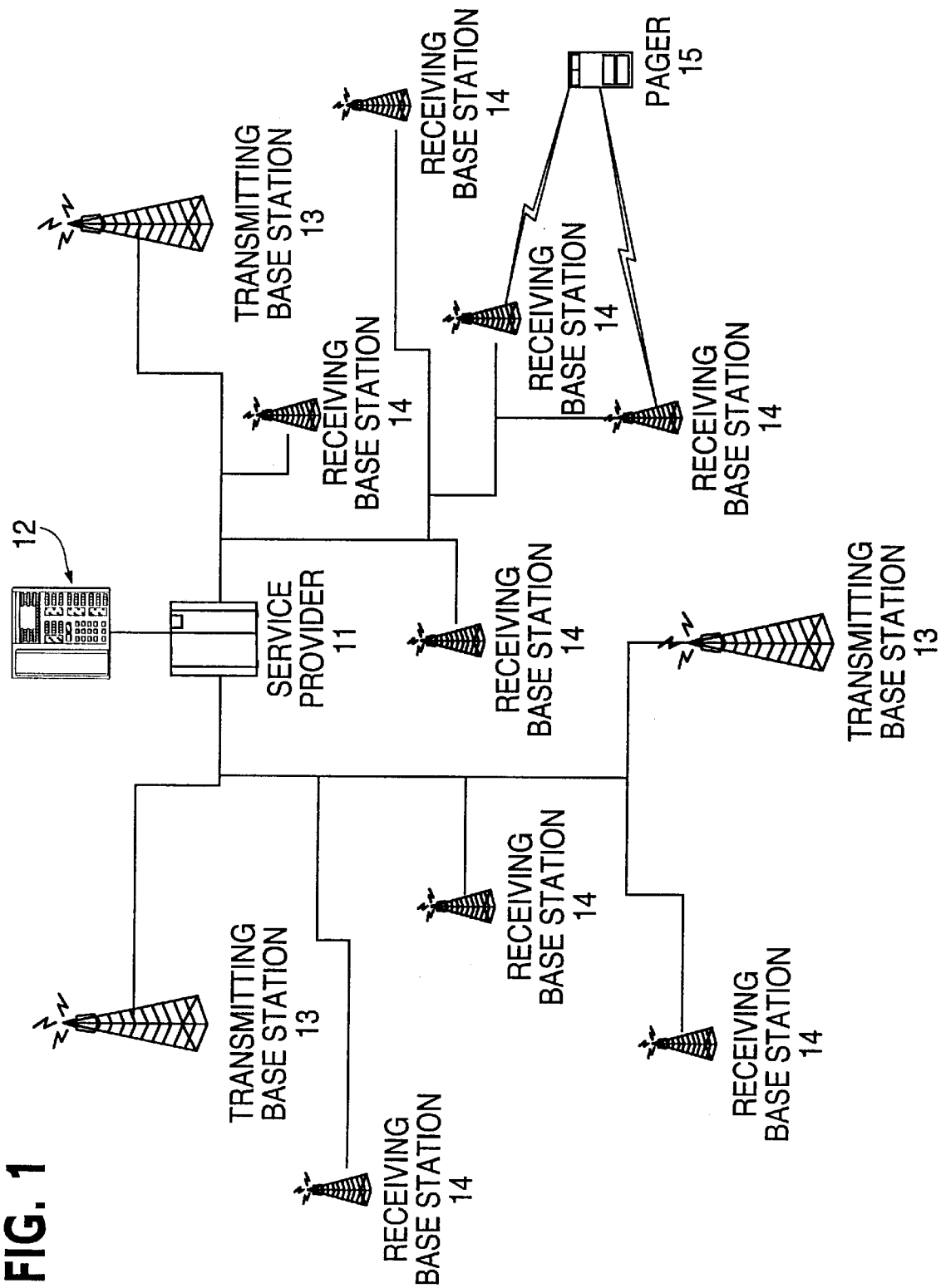
FIG. 1 is a schematic diagram of a conventional two-way paging network with which the present invention may be practiced.
Figure 2:
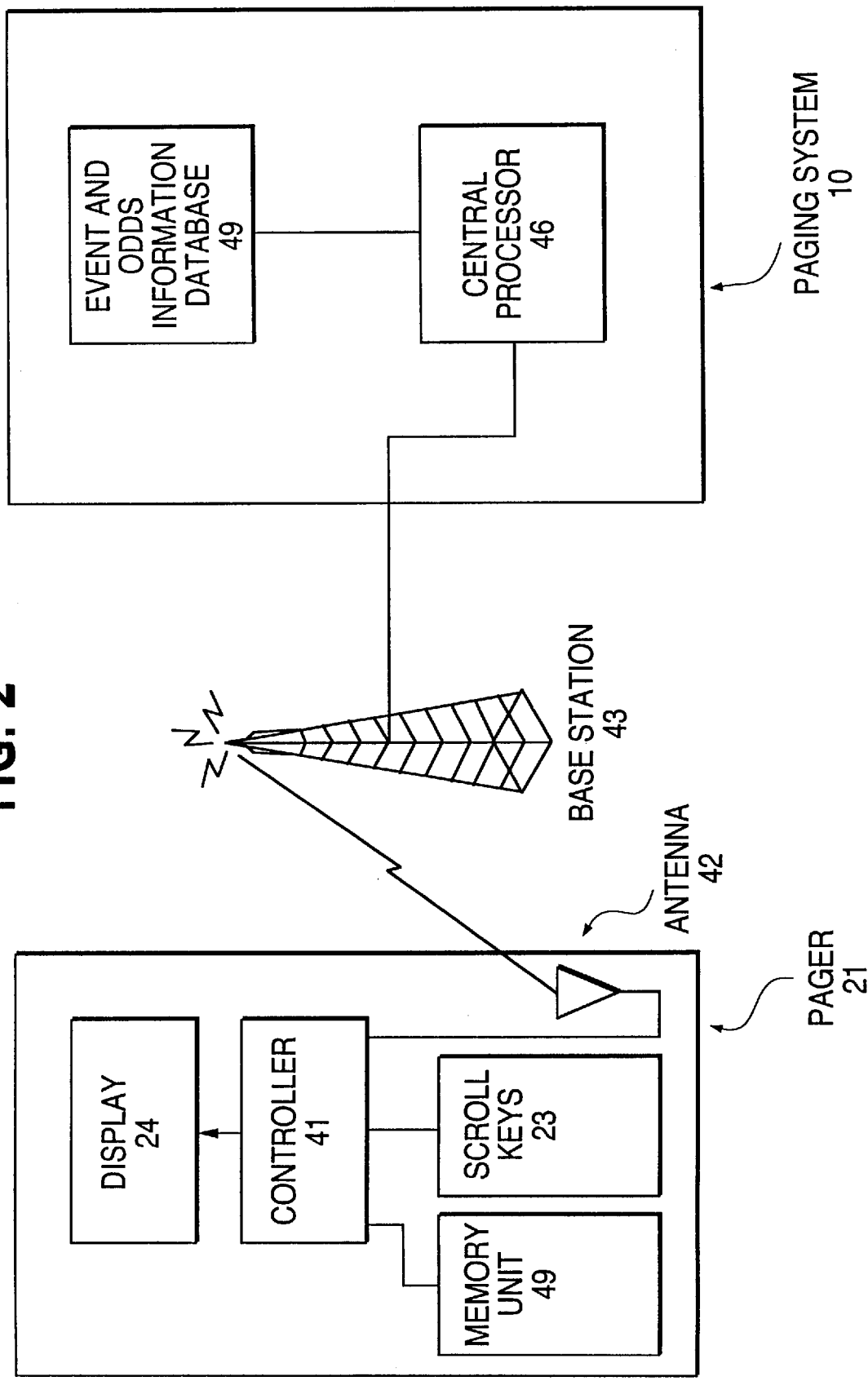
FIG. 2 is a diagram of the key components of the system of the present invention.

As illustrated in FIG. 2, under the principles of the present invention, a service provider maintains a paging system 10. Paging system 10 is provided with a central processor 46 and a database 49 which is connected to processor 46.

The database 49 will contain information about events on which wagers may be placed. Such information may include, for example, the time, place and participants in the event. The information may also include the expected outcome of the event or the odds of possible outcomes. The events may include, for example, horse racing and other sporting events.

The information is retrieved by the central processor 46 and transmitted via base station 43 to the pager 21 of a pager user who has subscribed with the paging system service provider for the gambling service. The pager 21 receives the transmission with antenna 42. The transmitted information is processed by controller 41 and may be stored in a memory unit 49.

Pager 21 further includes an input device, e.g. scroll keys 23, which can be used to instruct the controller 41 to display the received event information on display 24. Scroll keys 23 can further be used to scroll through the information if there is more information that can fit on display 24 at one time.

In such a case, the additional information may be stored in memory unit 49. Additionally, if information is transmitted significantly before the event on which wagers will be placed is to begin, the memory unit 49 can be used to store the information until the pager user is ready to view it and place a wager.

The processor 46 may access the information in database 49 and regularly transmit event information to the pager 21 at a specified period of time before the events concerned begin. The pager user may request this arrangement and specify how soon before each event he or she is to be sent the event information.

Figure 3:
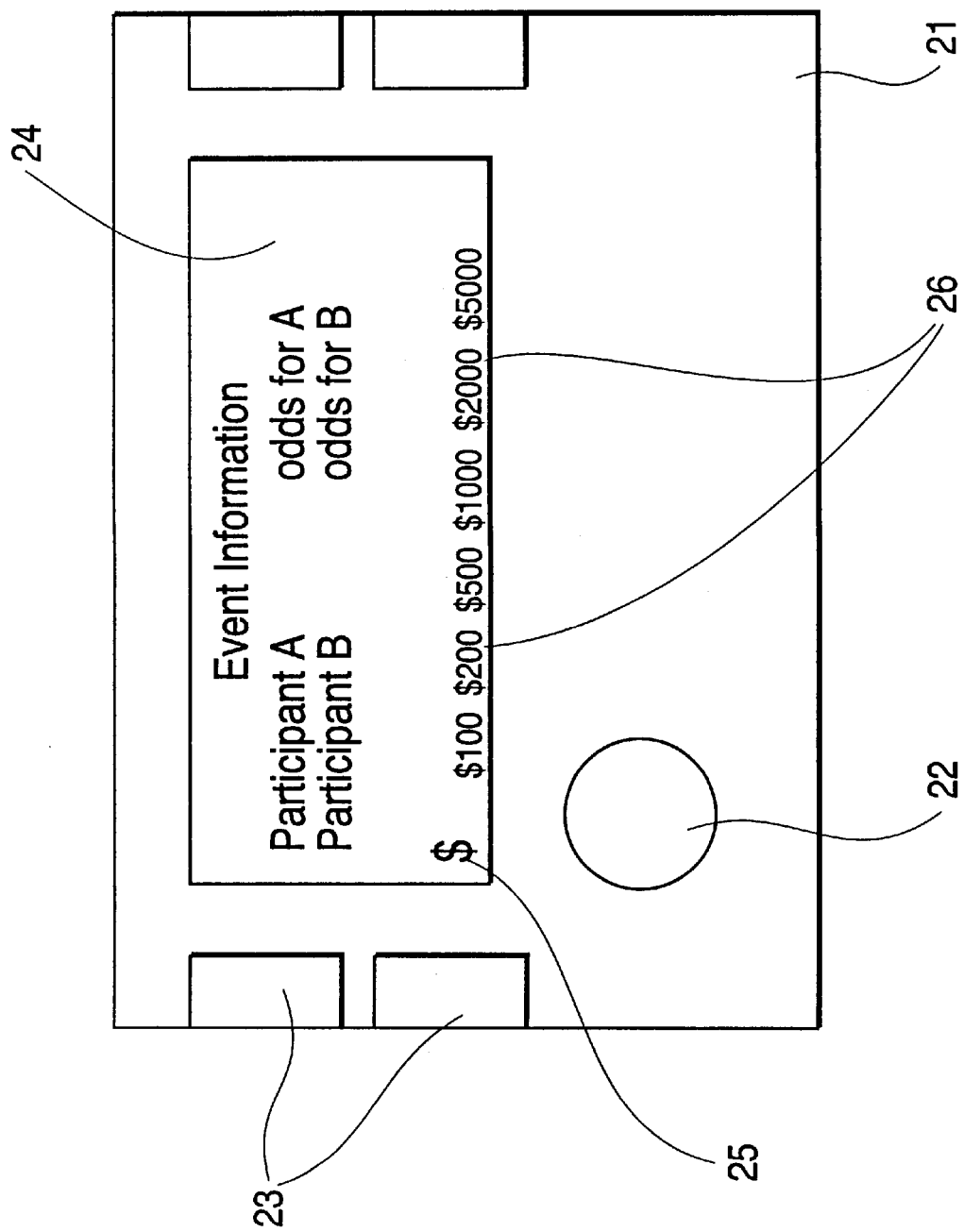
FIG. 3 is a diagram of a pager according to the principles of the present invention.

Alternatively, the user's pager may have a dedicated button which, when pushed, sends a request for current gambling event information to the service provider. In the preferred embodiment, however, as illustrated in FIG. 3, the user's pager 21 includes a liquid crystal display 24. On the display 24, the user will find an icon 25 which, when selected, sends the request to the service provider for current gambling event information.

To select the icon, the pager is provided with buttons 23 for moving a cursor (not shown) on display 24. When the cursor is highlighting the icon 25, the user pushes the select button 22. The user's pager may be programmed with this feature by the service provider when the contract between the service provider and the pager user is set up and the pager user indicates a desire for the gambling service.

The pager 21 may also have additional icons 26 which list a variety of increasing wager amounts. After the event information is received and displayed on display 24 as shown in FIG. 3, the pager user may again use keys 23 to move the cursor to highlight the listing for a particular participant. The selection button 22 is then pressed to place a wager on that participant.

Similarly, the pager user may select other information displayed about the participant to further detail the bet. For example, if a point spread is displayed, the pager user may select the spread as described above to wager that the indicated participant will win and cover the spread.

Alternatively, if, for example, odds are displayed on whether the participant will place or show, the pager user may highlight those odds with the cursor and press the select button 22 to wager that the participant will place or show as indicated.

Finally, the pager user may highlight and select a wager amount from the options displayed on the lower portion of display 24. When all the necessary information has been selected, the pager 21 transmits the wager to the service provider. The service provider may then cover the wager or convey it to a party who will do so by previous arrangement.

Under the principles of the present invention, the wager information, e.g. participant, point spread, specific result, and amount, may be displayed for the pager user as each piece of information is input. This allows the pager user to be sure no mistake has been made in placing the wager. The pager 21 may then wait until icon 25 or another icon is selected to transmit the wager.

Figure 4:
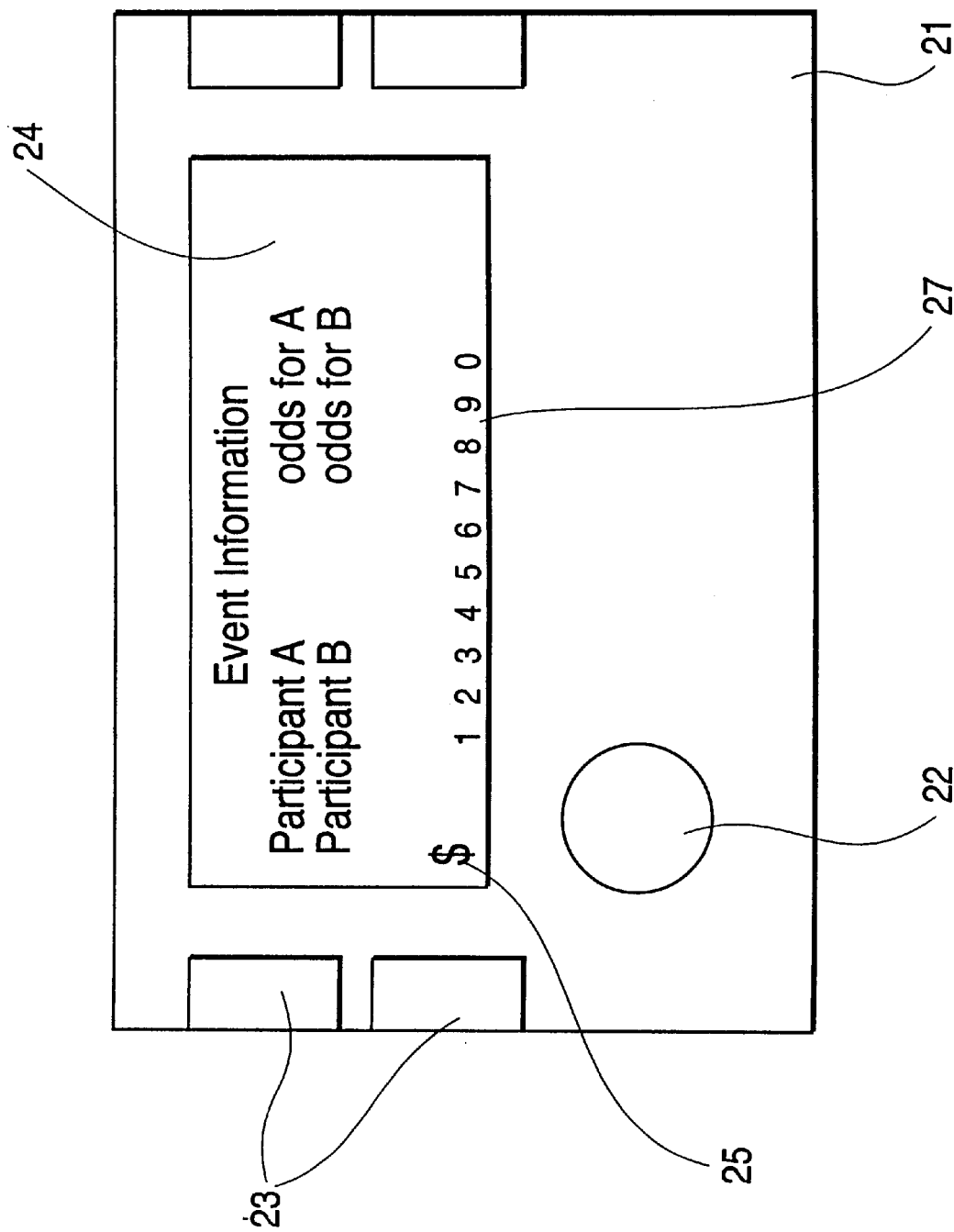
FIG. 4 is a diagram of a pager according to the principles of the present invention.

As illustrated in FIG. 4, a pager according to the present invention may have a virtual numeric keyboard 27 to input any desired wager amount. With virtual keyboard 27, the input keys 23 are again used to move a cursor over display 24. When the appropriate digit is highlighted, it is selected by pressing selection button 22. The process then repeats until the desired wager amount is entered. In all other respects, the pager of FIG. 4 functions as described above.

The preceding description has been without regard to the location of the pager receiving the event information. While the pager unit of the present invention may be used from any location in a paging service area, i.e. "off-track betting", the pager unit of the present invention may also be located at the site of the event on which the wagers are placed.

As shown in FIG. 5, a number of seats 51 are provided for spectators at an event on which wagers may be placed. The event occurs in event area 59.

A pager unit 21 according to the present invention as previously described may be associated with each seat 51. For example, the pager unit 21 may be located in the arm 52 of a seat 51 as shown in the lower part of FIG. 5. Alternatively, the pager unit 21 may be attached to the back 58 of a seat 51 as shown in the upper part of FIG. 5.

In such a scenario, the paging system supporting the pager units 21 may be localized and operated by the race track or other event forum solely for the use of placing wagers from each seat 51.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of using a paging system for wagering comprising:

compiling a database of event information about events on which wagers can be selectively placed;

accessing said event information in said database with a central processor;

wirelessly transmitting said event information to a pager unit with a paging system comprising a plurality of transceivers;

receiving transmissions containing said event information with a pager unit;

displaying said event information with a display of said pager unit;

inputting data to said pager unit in response to receipt of said event information, said data comprising wager information which represents at least a predicted outcome of the event referenced by said event information and an amount of a wager;

wirelessly transmitting said wager information to said paging system;

accepting or placing a wager from a user of said pager unit in accordance with said wager information; and displaying a plurality of numerically ordered wager amounts on said display in response to receipt of said event information;

wherein, said step of inputting comprises selecting a desired wager from among said displayed amounts.

2. A method as claimed in claim 1, wherein said event information comprises:

a listing of participants in said event; and information about at least one anticipated outcome of said event.

3. A method as claimed in claim 1, further comprising:

displaying an event information request icon on said display;

selecting said icon with data input means; and transmitting a request for event information in response to the selection of said icon.

4. A method as claimed in claim 1, further comprising storing said event information in a memory unit of said pager unit.

5. A method as claimed in claim 1, further comprising:

providing a plurality of stations for wagering; and associating one of said pager units with each said station.

6. A method as claimed in claim 5, wherein said stations are seats from which said event is directly observable.

* * * * *